United States Patent [19]

Prochazka

[11] 4,023,975

[45] May 17, 1977

[54] HOT PRESSED SILICON CARBIDE CONTAINING BERYLLIUM CARBIDE

[75] Inventor: Svanite Prochazka, Ballston Lake, N.Y.

[73] Assignee: General Electric Company, Schenectady, N.Y.

[22] Filed: Nov. 17, 1975

[21] Appl. No.: 632,481

[52] U.S. Cl. .............................................. 106/44
[51] Int. Cl.² .................. C04B 35/52; C04B 35/70
[58] Field of Search ..................... 106/44; 423/345

[56] References Cited

UNITED STATES PATENTS

| | | |
|---|---|---|
| 2,412,373 | 12/1946 | Wejnarth .......................... 106/44 X |
| 3,035,325 | 5/1962 | Nicholson et al. ............... 106/44 X |
| 3,564,086 | 2/1971 | Nishigaki et al. ................. 106/44 X |

*Primary Examiner*—Carl F. Dees
*Attorney, Agent, or Firm*—Jane M. Binkowski; Joseph T. Cohen; Jerome C. Squillaro

[57] ABSTRACT

A dense polycrystalline silicon carbide body is produced by hot pressing a particulate mixture of silicon carbide and beryllium carbide.

9 Claims, No Drawings

HOT PRESSED SILICON CARBIDE CONTAINING BERYLLIUM CARBIDE

The invention herein described was made in the course of or under a contract or subcontract thereunder (or grant) with the Department of the Navy.

The chemical and physical properties of silicon carbide make it an excellent material for high temperature structural applications. However, silicon carbide is produced in the form of particles or powder from which dense bodies must be formed.

Silicon carbide powder alone cannot be hot pressed to form a dense body. The present invention is directed to hot pressing a particulate mixture of silicon carbide and beryllium carbide to produce a novel dense polycrystalline body of silicon carbide.

Briefly stated, the present process comprises admixing silicon carbide particles with an amount of beryllium carbide particles ranging from 0.1% to 1.5% by weight of said silicon carbide, said particles ranging in size up to 5 microns, and hot pressing the resulting particulate mixture at a temperature ranging from 1850° C to 2300° C under a minimum pressure of about 3000 psi to produce a pressed body having a density of at least 98% of the theoretical density for silicon carbide.

The silicon carbide particles or powder used in the present invention can be $\alpha$- or $\beta$-silicon carbide or mixtures thereof. The size of the silicon carbide particles can vary from submicron size to 5 microns. As a practical matter, silicon carbide particles larger than 5 microns cannot be hot pressed to the desired 98% density. Silicon carbide particles of submicron size are preferred since the smaller the particle size, the lower are the temperatures and pressures required to hot press the material to the present density.

$\beta$-silicon carbide powder can be prepared by a number of techniques as, for example, by direct synthesis from the elements, by reduction of silica, or by pyrolysis of compounds containing silicon and carbon as well as hot plasma techniques. At present, all of these processes produce $\beta$-silicon carbide in a fine particle size of one micron or less.

All polytype compositions of the $\alpha$-SiC are operable in the present invention. Fine-sized $\alpha$-SiC can be prepared by a number of techniques. For example, abrasive grade silicon carbide, which is always predominantly $\alpha$-SiC, can be milled and the milled powder admixed with a liquid such as water to separate fractions of large and fine-sized particles by sedimentation. Specifically, the large-sized particles are allowed to settle and the liquid in which the desired finer-sized particles float is decanted and evaporated to yield the fine-sized, submicron particle fraction.

Beryllium carbide, $Be_2C$, is used as a densification agent in the present process, and it is used in an amount ranging from about 0.1% by weight to 1.5% by weight of the silicon carbide. Amounts of beryllium carbide in excess of 1.5% by weight do not provide any advantage. The $Be_2C$ has a particle size ranging up to 5 microns. Preferably, to promote its dispersibility in silicon carbide particles, it should have an average particle size the same as, or preferably, finer than that of silicon carbide. The size of the beryllium carbide particles does not change substantially during hot pressing.

The silicon carbide and beryllium carbide particles can be admixed by a number of techniques such as, for example, ball milling or jet milling, to attain at least a significantly uniform distribution of the beryllium carbide. A substantially uniform dispersion of the beryllium carbide particles in the silicon carbide is preferred since the more uniform the dispersion, the more uniform is the microstructure, and therefore, the properties of the resulting dense body. Mixing should be carried out in a dry atmosphere to prevent hydroylzation of the beryllium carbide such as dry air or dry argon.

In carrying out the present process, the particulate mixture is hot pressed at a pressure and temperature and for a sufficient period of time to produce the present dense product. Specifically, pressing temperature ranges from about 1850° C to 2300° C and applied pressure at the pressing temperature ranges from about 3000 psi to a maximum pressure which is limited by the available pressing equipment. For most applications pressure ranges from about 3000 psi to 10,000 psi. Thus for solid graphite dies the upper limit is about 5000 psi and for graphite fiber-wound dies the upper limit is about 10,000 psi. The specific temperature and pressure used is determinable empirically and depends largely on the powder being pressed and the specific dense product desired. The higher the pressure, the lower is the pressing temperature required, but as a practical matter, temperatures below 1850° C will not produce the present product. On the other hand, temperatures higher than 2300° C provide no advantage. A pressing temperature from 1850° C to 2100° C is preferred since pressing temperatures higher than 2100° C provide no advantage. Specifically, temperatures between 2100° C and 2300° C may coarsen the product but do not affect density. It is advantageous to use a pressure close to the maximum available because the application of such high pressure makes it possible to keep the pressing temperature low enough to control grain growth. Generally, hot pressing in the present process is carried out in a period of time ranging up to about 30 minutes and longer periods of time usually do not provide any significant advantage.

Hot pressing of the particulate mixture is carried out in an atmosphere in which the material is substantially inert, i.e. an atmosphere which has no significant deteriorating effect on its properties such as, for example, argon, helium or a vacuum. The hot pressing atmosphere can range from a substantial vacuum to atmospheric pressure.

The use of $\alpha$-silicon carbide particles in the present process results in a pressed body wherein all of the silicon carbide is $\alpha$-silicon carbide. On the other hand, the use of $\beta$-silicon carbide particles results in a hot pressed body containing $\alpha$-silicon carbide in an amount of at least 50% by weight, and generally, in an amount ranging from 50% to 80% by weight of the total amount of silicon carbide depending on the degree to which $\beta$-silicon carbide converts to $\alpha$-silicon carbide during hot pressing.

The hot pressed body of the present invention has a density ranging from 98% to 100% of the theoretical density for silicon carbide. The product is composed of at least two phases, a silicon carbide phase and a beryllium carbide phase. The polytype composition of the silicon carbide in the present product is determinable by X-ray analysis and ranges from $\alpha$-silicon carbide alone to a composition composed of 50% by weight $\alpha$-silicon carbide and 50% by weight $\beta$-silicon carbide.

The morphology of the $\alpha$- and $\beta$-silicon carbides in the present pressed product is undistinguishable. Specifically, the silicon carbide in the product is present in the form of substantially equiaxed grains ranging in size from about 1 to 50 microns with the average grain size depending largely on pressing temperatures. The beryllium carbide is present in an amount ranging from 0.1% by weight to 1.5% by weight based on the total amount of silicon carbide. A minor portion of the beryllium carbide is in solid solution with the α- and β-silicon carbides and the remainder is present as grains of beryllium carbide distributed at least significantly uniformly through the hot pressed body. The extent of the beryllium carbide solution depends on temperature and it is determinable by a number of techniques such as, for example, chemical analysis. Generally, the amount of beryllium carbide in solid solution ranges up to about 0.03% by weight of silicon carbide.

The present hot pressed product is useful in structural applications such as components for gas turbines. It also exhibits P-type conductivity and frequently has a resistivity at room temperature ranging up to 100 ohm cm. The extent of such conductivity depends on the extent to which the beryllium carbide is in solid solution with the silicon carbide. The present product is also useful as a resistor and a temperature sensor.

Preferably, the silicon carbide powder used in the present process is free or substantially free of oxygen which usually is present in the form of silica. During hot pressing the silica may react to produce a glassy silica phase and/or a metallic silicon phase which can have a deleterious effect on the mechanical properties of the product at elevated temperature. To prevent formation of these phases, or prevent their formation in a significant amount, the oxygen content of the silicon carbide, which is determinable by standard techniques, should be less than 1% by weight. To reduce or eliminate oxygen content, the silicon carbide powder can be calcined in a vacuum or inert gas such as argon at a temperature ranging from about 1400° C to 1800° C.

In one embodiment of the present process, elemental carbon is used to reduce or eliminate oxygen content of the silicon carbide. In this embodiment, elemental carbon of submicron size in an amount ranging from 0.1% to 1% by weight of the silicon carbide is admixed with the silicon carbide. Mixing can be carried out in a conventional manner and can be carried out at the same time that the beryllium carbide is being admixed. The specific amount of elemental carbon used depends largely on the oxygen content of the silicon carbide powder. The resulting product contains, in addition to the silicon carbide and beryllium carbide phases, particles of elemental carbon substantially of submicron size distributed substantially uniformly through the hot pressed body.

Alternatively, the elemental carbon can be produced in situ by pyrolyzing a mixture of a carbonaceous additive and silicon carbide, which may or may not contain the beryllium carbide, before hot pressing is carried out. The carbonaceous additive is used in an amount equivalent to 0.1% by weight to 1.0% by weight of free carbon based on the total amount of silicon carbide. Specifically, the carbonaceous additive is an organic material which is heat-decomposible to produce particulate free carbon of submicron size in the required amount. In addition, the carbonaceous organic material is a solid or liquid at room temperature and completely decomposes at a temperature in the range of about 50° C to 1000° C to yield free carbon and gaseous products of decomposition. Also, the carbonaceous organic material is one which has no significant deteriorating effect on the silicon carbide or beryllium carbide.

High molecular weight aromatic compounds are the preferred carbonaceous organic materials for making the carbon addition since they ordinarily give on pyrolysis the required yield of particulate free carbon of submicron size. Examples of such aromatic compounds are a phenolformaldehyde condensate resin which is soluble in acetone as well as condensate polymers of resorcinol-formaldehyde, aniline-formaldehyde, and cresol-formaldehyde. A preferred group of carbonaceous additives are polymers of aromatic hydrocarbons such as polyphenylene or polymethylphenylene which are soluble in aromatic hydrocarbons and yield on heat-decomposition up to 90% of free carbon.

The present process provides grain growth control on hot-pressing of silicon carbide. When β-silicon carbide is used, a significant portion is transformed to the α-form, i.e. into the more stable form. It is believed that the beryllium carbide induces a rapid β- to α-transformation during hot pressing. The growing α-silicon carbide grains impinge on each other early in their development, cease to grow and result in a hot pressed product with a relatively fine-grained microstructure. When α-silicon carbide is used, it is believed that the beryllium carbide promotes densification throughout the material so that again growing α-silicon carbide grains impinge on each other early in their development, cease to grow and result in a hot pressed product with a relatively fine-grained microstructure.

The present invention provides a number of advantages. One advantage is that since the present process provides significant grain growth control, hot pressing can be carried out through a wider temperature range which is particularly economical and practical since it eliminates the need for critical temperature controls.

The second advantage is that the present hot pressed product can be produced free of the glassy silica phase and metallic silicon phase, and in such instance it has particularly useful characteristics such as retaining its room temperature shape and mechanical properties at high temperatures. Specifically, the present product free of glassy silica phase and metallic silicon phase undergoes no significant change in density or mechanical properties after substantial exposure in air to temperatures ranging up to about 1700° C, and after substantial exposure in an atmosphere in which it is substantially inert such as argon to temperatures above 1700° C ranging up to about 2300° C. Such properties make it particularly useful for high temperature structural applications such as gas turbine blades. Although, at temperatures of 2000° C or higher, β-silicon carbide in the present pressed product will transform to α-silicon carbide, the newly formed α-silicon carbide grains cannot grow significantly because they impinge on and are blocked by the substantial number of α-silicon carbide grains already present substantially uniformly throughout the product. As a result, any additional transformation of β-silicon carbide has no significant effect on shape or mechanical properties of the product.

The invention is further illustrated by the following examples.

EXAMPLE 1

A carbon-rich silicon carbide powder prepared by a pyrolytic process was used. Specifically, it was submicron powder composed of β-silicon carbide with free carbon uniformly and intimately dispersed therein. The powder was analyzed and the following results were established:

|  | (% by weight) |
|---|---|
| Total carbon | 29.6% |
| Free carbon | 0.7% |
| Boron | <0.005% |
| Oxygen | 0.08% |
| Fe | 0.004% |
| W | 0.009% |
| Al | <0.001% |
| Specific surface area | 8 m$^2$/g |
| Mean average particle size | 0.24 μ |
| Density | 3.20 g/cc |
| Polytype composition by X-rays | β-SiC |

50 g of this powder was mixed with 0.42 g of commercial beryllium carbide ($Be_2C$) powder of submicron size. This is equivalent to 0.84% by weight beryllium carbide, or 0.5% by weight beryllium, based on silicon carbide. The silicon carbide and beryllium carbide powders were dispersed in 50 cc of 1% solution of stearic acid in benzene and the mixture was milled in a vibratory mill with ⅛ inch cemented carbide balls for 2 hours.

The solvent was evaporated and the resulting significantly uniform powder mixture was placed in a 2 inch I.D. cylindrical graphite die and hot pressed in an atmosphere of 1 Torr of flowing argon using a hot pressing pressure of 10,000 psi with a 20 minute hold at the hot pressing temperature 1900° C. The pressed product was allowed to cool to room temperature in the die press in argon.

The pressing recovered from the die was impermeable and yielded a bulk density of 3.17 g/cc corresponding to 98.7% of the theoretical of silicon carbide. Its room temperature electrical resistivity using silver electrodes was determined to be 29 ohm cm.

Examination of the pressing, i.e. pressed product, showed it to have a significantly uniform microstructure. It was comprised of silicon carbide and a beryllium carbide phase. The silicon carbide was composed of a mixture of α- and β-silicon carbides with the α-silicon carbide being present in major amount.

EXAMPLE 2

The powders used in this example were the same as that set forth in Example 1.

The procedure used in this example was substantially the same as that set forth in Example 1 except that 0.5% by weight of beryllium carbide based on the silicon carbide was used which is equivalent to 0.3% by weight beryllium. Also, the hot pressing temperature was 1950° C.

The pressing recovered from the die was a dense impervious body which had a density of 3.18 g/cc corresponding to 99.1% of theoretical density of silicon carbide. Its room temperature electrical resistivity was 40 ohm cm.

The pressing was sectioned for metallography and revealed silicon carbide grains approximately equiaxed with an average grain size of 4.0 microns.

Examination of the pressing, i.e. pressed product, showed it to have a significantly uniform microstructure. It was comprised of silicon carbide and a beryllium carbide phase. The silicon carbide was composed of a mixture of α- and β-silicon carbides with the α-silicon carbide being present in major amount.

EXAMPLE 3

The powders used in this example were the same as that set forth in Example 1.

The procedure used in this example was substantially the same as that set forth in Example 1 except that 1.66% by weight of beryllium carbide based on the silicon carbide was used which is equivalent to 1.0% by weight beryllium. Also, the hot pressing pressure was 6000 psi with a 30 minute hold at 2000° C.

The pressing recovered from the die was a dense impervious body which had a density of 3.20 g/cc corresponding to 99.8% of theoretical density of silicon carbide. Its room temperature electrical resistivity was 69 ohm cm.

The pressing was sectioned for metallography and revealed silicon carbide grains and beryllium carbide grains and a substantially uniform microstructure. The silicon carbide grains were approximately equiaxed with an average grain size of 6.5 microns. An X-ray analyses of the pressing yielded a composition of 24% by weight β-silicon carbide and 76% by weight α-polytypes of silicon carbide.

EXAMPLE 4

The silicon carbide powder used in this example was the same as that set forth in Example 1.

The procedure used in this example was substantially the same as that set forth in Example 1 except that no beryllium carbide was used.

The pressing recovered from the die was porous, friable and obviously not consolidated. It had a density of 78% of theoretical density of silicon carbide.

EXAMPLE 5

From commercial abrasive grade α-silicon carbide (mixed polytype), a fraction of less than 5 micron particle size is prepared by milling, acid leaching and separation by sedimentation.

Beryllium carbide ($Be_2C$) powder of submicron size is admixed with the α-silicon carbide fraction in an amount of 1% by weight of the silicon carbide. Such mixing can be carried out as set forth in Example 1. The resulting particulate mixture can be hot pressed in a graphite die in an atmosphere of 1 Torr of flowing argon using a hot pressing pressure of 10,000 psi with a 30 minute hold at a hot pressing temperature of 2050° C. The resulting hot pressed body will be comprised of an α-silicon carbide phase and a beryllium carbide phase and should have a density of at least 98% of the theoretical density for silicon carbide.

In copending application Ser. No. 632,495, now U.S. Pat. No. 3,993,602 entitled "Polycrystalline Silicon Carbide With Increased Conductivity" filed of even date herewith in the name of Svante Prochazka and assigned to the assignee hereof, there is disclosed polycrystalline silicon carbide with increased electrical conductivity at room temperature produced by shaping a particulate mixture of β-silicon carbide, boron additive, beryllium carbide and a carbonaceous additive into a green body and sintering the body producing a sintered body having a density of at least about 85% of the theoretical density of silicon carbide.

In copending U.S. patent application Ser. No. 632,496, now U.S. Pat. No. 4,005,235 entitled "Dense Sintered Boron Carbide" filed of even date herewith in the name of Svante Prochazka and assigned to the assignee hereof, there is disclosed a polycrystalline boron carbide sintered body containing beryllium carbide with a density ranging from 85% to 96% of the theoretical density of boron carbide and having a uniform microstructure of equiaxed grains.

What is claimed is:

1. A method of preparing a polycrystalline silicon carbide body having a density of at least 98% of the theoretical density of silicon carbide comprising admixing silicon carbide particles with an amount of beryllium carbide particles ranging from 0.1% by weight to 1.5% by weight of said silicon carbide to form a mixture, said particles ranging from submicron size to 5 microns, and hot pressing the resulting particulate mixture at a temperature ranging from 1850° C to 2300° C under a minimum pressure of 3000 psi.

2. A method according to claim 1 wherein said silicon carbide particles are $\alpha$-silicon carbide.

3. A method according to claim 1 wherein said silicon carbide particles are $\beta$-silicon carbide.

4. A method according to claim 1 wherein said silicon carbide particles are a mixture of $\alpha$- and $\beta$-silicon carbides.

5. A method according to claim 1 wherein particles of elemental carbon of submicron size in an amount ranging from 0.1% to 1% by weight of said silicon carbide are admixed to form said mixture.

6. A method according to claim 1 wherein a carbonaceous additive is admixed to form said mixture, said additive being heat-decomposible at a temperature ranging from 50° C to 1000° C to produce elemental carbon of submicron size, said additive being used in an amount equivalent to 0.1% by weight to 1.0% by weight of elemental carbon based on said silicon carbide, and pyrolyzing the formed mixture to produce elemental carbon in situ.

7. A polycrystalline silicon carbide body having a significantly uniform microstructure with a grain size ranging up to 50 microns and a density ranging from 98% to 100% of the density of silicon carbide, said body consisting essentially of silicon carbide and beryllium carbide, said silicon carbide being composed of from 50% by weight to 100% by weight of $\alpha$-silicon carbide with the remainder being $\beta$-silicon carbide, said beryllium carbide being present in an amount ranging from 0.1% by weight to 1.5% by weight of the total amount of said silicon carbide, a minor portion of said beryllium carbide being in solid solution with said silicon carbide with the remainder being in the form of grains of a beryllium carbide phase.

8. A polycrystalline silicon carbide body according to claim 7 wherein particles of elemental carbon of substantially submicron size in an amount ranging from 0.1% by weight to 1% by weight of the total amount of said silicon carbide are distributed substantially uniformly throughout said body.

9. A polycrystalline silicon carbide body according to claim 7 having a P-type semiconductivity with a resistivity in air at room temperature ranging up to 100 ohm cm.

* * * * *